Sept. 30, 1952            E. T. WHEELER            2,611,936
COMBINATION SHUTTER AND AWNING
Filed May 22, 1951            2 SHEETS—SHEET 1
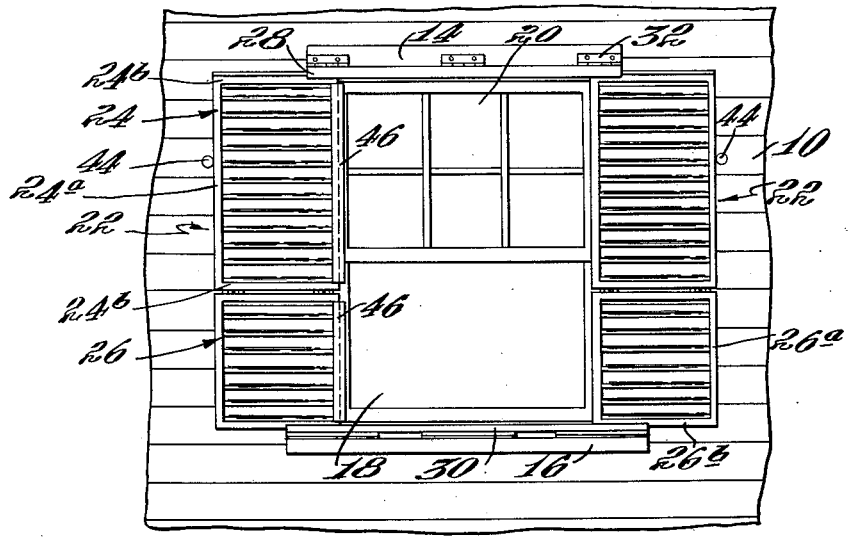
Fig. 1
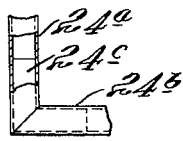
Fig. 14
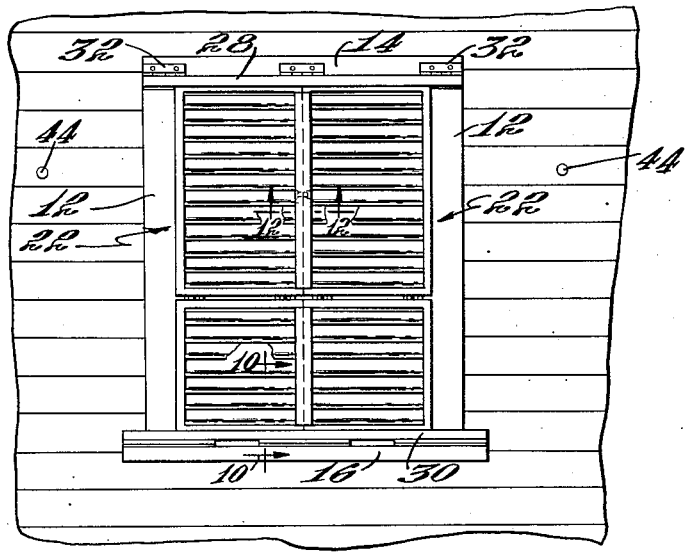
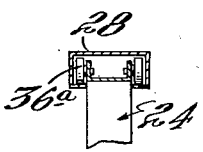
Fig. 15
Fig. 8ª
Fig. 2
Inventor
Everett T. Wheeler
by Robt, Cushman, & Grover
attys.

Sept. 30, 1952          E. T. WHEELER          2,611,936
COMBINATION SHUTTER AND AWNING
Filed May 22, 1951          2 SHEETS—SHEET 2
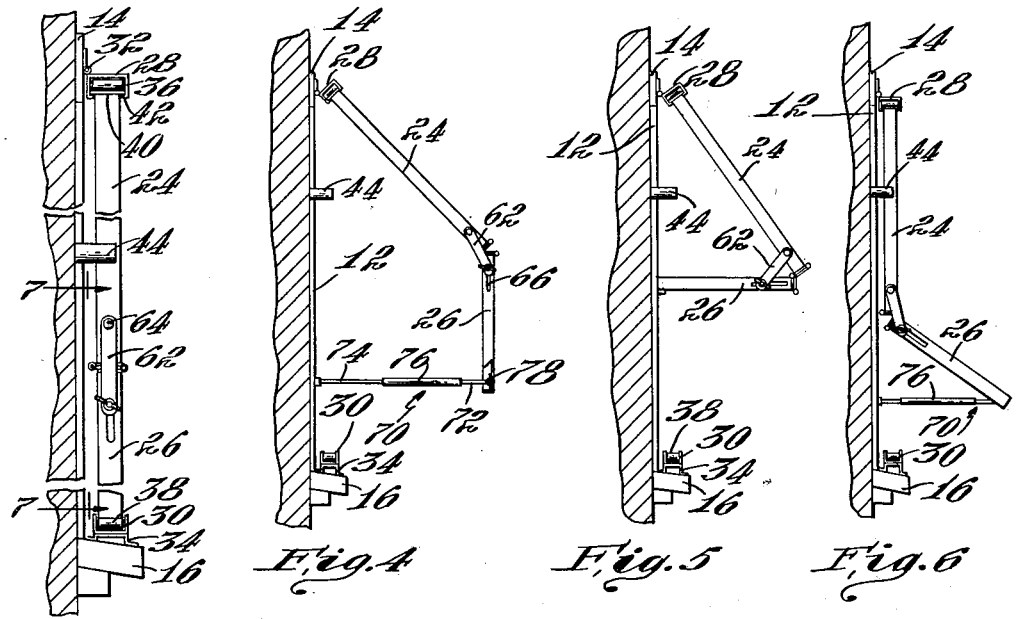
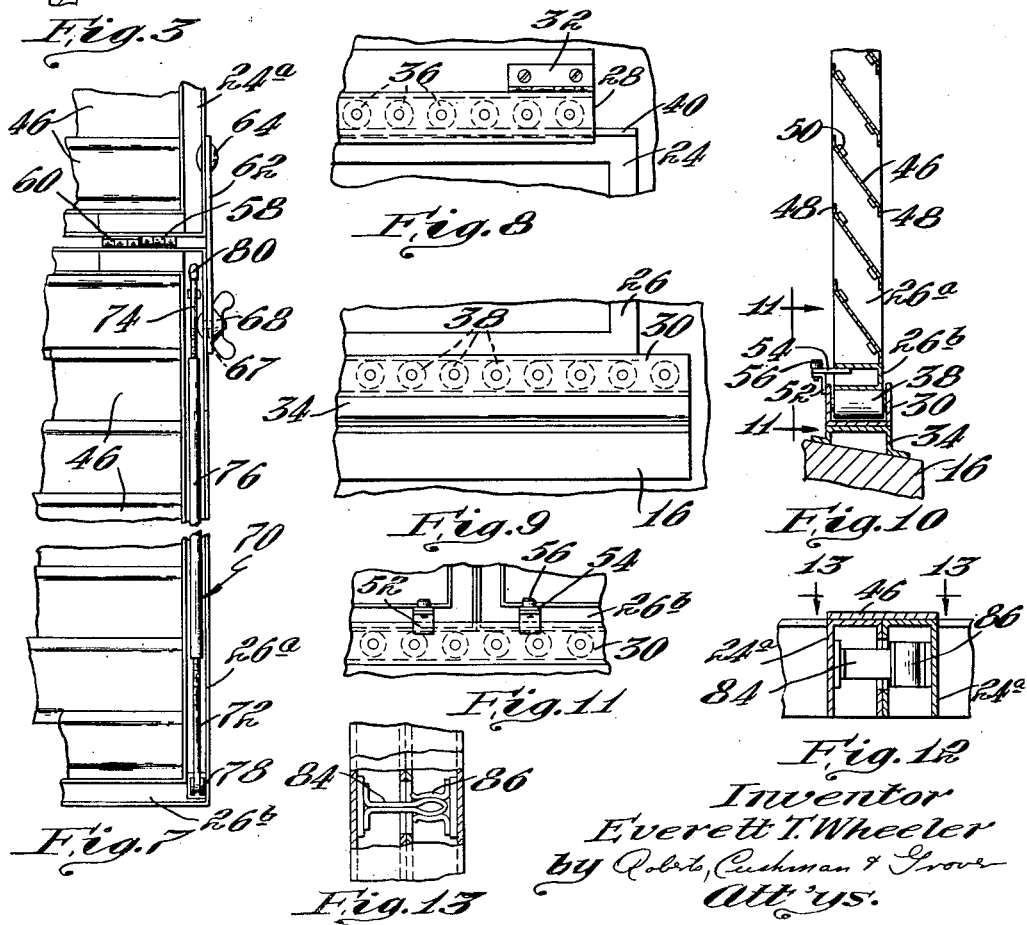
Inventor
Everett T. Wheeler
by Roberts, Cushman & Grove
Att'ys.

Patented Sept. 30, 1952

2,611,936

UNITED STATES PATENT OFFICE 2,611,936

COMBINATION SHUTTER AND AWNING

Everett T. Wheeler, Brookline, Mass.

Application May 22, 1951, Serial No. 227,684

15 Claims. (Cl. 20—57.5)

This invention relates to a combined shutter and awning and has for its principal objects the provision of a device which may permanently be installed on the window frame and which may be disposed in any one of several possible positions, to serve as a closure for the window, as conventional ornamental shutters located at opposite sides of the window or as several different types of awning. Further objects are to provide a device which combines the features of both the shutter and awning so that as a shutter it serves as a barrier to wind, rain, fire and burglary, and as an awning it may be placed in any one of the large number of positions partially to cover the window so as to intercept the direct rays of the sun and yet to permit a free circulation of air. Still further objects are to provide a device which takes the place of a conventional awning, hence eliminating the need for installation and removal at the beginning and ending of the season, which eliminates the problem of storage since it may be left in place throughout the year, and which may easily be adjusted from within so as not to require setting up ladders outside the building.

As herein illustrated, the device includes a pair of shutter frames mounted on the window frame in such a fashion that they may be moved to and from each other from positions at opposite sides of the window to positions covering the window with their opposed edges abutting. The frames may also be swung angularly outwardly from the plane of the window, and each shutter frame is articulated to provide upper and lower sections which are angularly movable relative to each other. The frames are supported at their upper ends on a track extending along the top of the window, and there is also a track at the lower part of the window upon which the lower ends of the frames rest when disposed in the plane of the window, either in their closed or open positions. The lower sections of the frames may be disengaged from the lower track when the frames are swung outwardly for awning purposes and may be made fast in any one of a number of angular positions with respect to the upper sections so as most effectively to intercept the sun, depending upon the angle at which it enters the window. There are auxiliary brace means at the lower ends of the lower sections for supporting the frames at the desired angle to the window frame when the lower sections are disengaged from the lower track.

The invention will now be described in greater detail with reference to the accompanying drawings wherein:

Fig. 1 is a view in elevation of a portion of the wall of the house having a window therein on which is mounted the novel combination shutter and awning in an open position;

Fig. 2 is a corresponding view showing the combination shutter and awning in a closed position;

Fig. 3 is a vertical, side elevation of the combination shutter and awning shown in a position in which it functions as a shutter, as shown in Figs. 1 and 2;

Fig. 4 is a vertical side elevation showing the shutter frames swung out from the window frame to provide a drop front awning;

Fig. 5 is a corresponding view showing the shutter frames swung out from the window to form a standard type awning;

Fig. 6 is a vertical, side elevation of the shutter showing the upper section disposed in a position to close the upper part of the window and the lower section swung outwardly therefrom to form a low awning with the upper two thirds of the window area completely shuttered;

Fig. 7 is a fragmentary elevation taken on the lines 7—7 of Fig. 3;

Fig. 8 is a fragmentary elevation at the upper corner of the window showing the supporting track for the shutter frames;

Fig. 8a is an alternative way of supporting the shutter frames on the upper track;

Fig. 9 is a corresponding fragmentary view at the lower corner of the window showing a support for the lower end of the shutter frames;

Fig. 10 is a vertical section taken on the lines 10—10 of Fig. 2;

Fig. 11 is a fragmentary elevation taken on the lines 11—11 of Fig. 10;

Fig. 12 is a horizontal section taken on the lines 12—12 of Fig. 2;

Fig. 13 is a vertical section taken on the lines 13—13 of Fig. 12;

Fig. 14 is an alternative way of joining the vertical and horizontal channel members; and Fig. 15 is a fragmentary elevation showing anchoring means fastened to the window casing.

Referring to Figs. 1 and 2, there is shown for the purpose of illustration a portion of the side of the building 10, having a window therein to which is applied the combination shutter and awning which forms the subject matter of this invention. The window has the conventional casing consisting of vertical, spaced frame members 12, bounding the sides of the window, a horizontal upper frame member 14, and a sill 16 within which are mounted lower and upper sashes 18 and 20. The combined shutter and awning consists of a pair of shutter frames 22—22, illustrated in Fig. 1, as being disposed at opposite sides of the window casing and giving the appearance of a conventional shutter arrangement when the latter are open so as to uncover the window. In Fig. 2 the shutter frames are shown covering the window, for example, when the house is closed or for the purpose of keeping out wind, rain, and/or serving as protection against fire or burglary. Each of the shutter frames 22 is articulated.

The shutter frames 22—22 are mounted on the upper and lower tracks 28 and 30 for sliding movement to and from each other and for swinging movement about their upper ends away from the window so as to be disposed at an angle thereto. The upper track is in a form of a channel, the open side of which faces downwardly to receive the upper ends of the shutter frames, and the lower track is in the form of a channel facing upwardly to receive the lower ends of the shutter frames. The upper track 28 is fastened to the upper horizontal window frame member 14 by means of two or more hinges 32 which support the track and permit angular movement thereof outwardly from the window. The lower track is fastened to one or more brackets 34 which rest on the window sill 16. Each of the tracks or channels have distributed longitudinally thereof, for rotation about the substantially horizontal axis, a plurality of rollers 36 and 38. The upper sections 24 of the shutter frames 24 have flanges 40 along their upper edges adapted to be seated within the channel 28 against the roller bearings 36, and are retained therein by inwardly projecting lips 42—42 at opposite sides of the channel 28. The lower ends of the sections 26 merely rests within the channel 30 on the roller bearing 38 and are adapted to be disengaged from the channel when the shutter is used for an awning.

While the rolls are shown journaled in the walls of the channels alternatively, they may be mounted on the frame sections. Thus, as will be seen by reference to Fig. 8a, two or more pins may be made fast to the upper edges of the sections 24—24 so as to extend laterally from opposite faces, and on the ends of the pins may be placed rolls or wheels 36a—36a, the peripheries of which will bear on the lips 42—42 of the channel.

As thus constructed, it is evident that the shutter frames 22—22 may be moved laterally between the tracks 28 and 30 to positions uncovering the window, as shown in Fig. 1, or to positions covering the window, as shown in Fig. 2. Stops 44—44 are made fast to the building in positions to engage the outer edges of the frames when they are in their open positions to limit outward movement of the frames. Sealing strips 46 are made fast to the inner edges of the two sections of one of the frames so that when the frames are moved into abutting relation the sealing strips will overlie the joint between them, as shown in Fig. 2, thereby to prevent entrance of rain.

Each of the upper sections 24—24 is made up of spaced, parallel, vertical channel members 24a—24a and spaced, parallel, horizontal channel members 24b—24b, the ends of which are mitered and welded. If desired, rigid angle pieces 24c (Fig. 14) may be used to reinforce the corners of the frames. When using the corner pieces the mitered ends of the vertical and horizontal channel members are thrust over the ends of the angles and welded thereto. In like manner the lower sections 26—26 are made up of spaced, parallel, vertical channel members 26a—26a and spaced, parallel, horizontal channel members 26b—26b.

The frame members preferably are louvered, as shown in Fig. 10, having louver boards or slats 46 arranged transversely of the channels 24a—24a and 26a—26a. Each of the slats has, along opposite edges, flanges 48—48, and the slats are so arranged that the flanges of the successive slats lie substantially opposite each other. The ends of the slats are welded at the channels by tabs or lugs 50. In lieu of slats the shutter frames may have continuous surfaces to form an imperforate type shutter and awning.

In order to hold the shutters in their closed positions, as seen in Fig. 2, a pair of brackets 52 (Fig. 10) are fastened to the inner walls of the lower track 30, and a plate 54 is fastened to the lower channel 26b of each of the lower sections 26—26. When the frames are brought together in closed position, the plates 54—54 overlie the brackets 52—52 and have registering holes therein through which may be dropped fastening pins 56—56 which thus prevent separation of the shutter frame. Alternatively, the brackets 52—52 may be extended throughout the entire width of each frame and have a series of holes therein for registration with the plates 52 so that the frames may be fixed at any desired spacing.

The shutter frames, as heretofore stated, consist of articulated sections 24 and 26, and these sections, as illustrated in Fig. 7, are joined by hinges 58 and 60 which permit movement of the sections from a common plane angularly with respect to each other in either direction through substantially 180°. The sections are maintained in a common plane, for example, when they are used solely for the purpose of a shutter by struts 62—62 (Fig. 7) pivotally fastened by means of rivets 64 to the lower part of the channels 24a of the upper sections. Near the upper ends of the channels 26a of the lower section 26 there are formed elongate slots 66 and short bolts 67 are passed through these slots and through holes in the lower ends of the struts 62 and have on them thumb nuts 68. With the foregoing construction it is apparent that the upper and lower sections of the shutter frames may be locked in a common plane, as shown in Fig. 3, or at various angles with respect to each other, as shown in Figs. 4, 5 and 6.

In Fig. 4, the shutter frames are swung out from the window frames and the two sections 24 and 26 are shown disposed at such an angle that the shutter frames form a drop front awning. In order to hold the frames out from the window, the lower ends of the frames are supported by a pair of braces 70, which are normally housed within the outer channels 26a—26a. As illustrated in Fig. 7, each brace 70 consists of a pair of threaded rods 72 and 74, joined by a sleeve 76, so that by rotation of the sleeve 76 the length of the brace may be changed. The rod 72 is pivotally connected to the channel at 78, and the rod 74 has a tip 80 for engagement with the window frame. The tip may be made of rubber or other material which will not slide easily along the window frame so that it will not be displaced. Alternatively, it may be a metal ball and open sockets 82 (Fig. 15) may be attached to the window frame at vertically spaced intervals to receive and support the tips 80, whether of rubber or metal. Such sockets may be formed by making keyhole slots in a metal strip 83 which may be attached to the window frame members 12—12. There may also be struck out from the strips 83—83 forwardly projecting prongs 85, or if desired, when the keyhole slots are formed the metal punched out may be bent downwardly to provide forwardly the projecting prongs 85 for a purpose which will appear hereinafter.

In order to lock the shutter frames together while they are being used as an awning, a latch is provided at the inner edges of the upper sections 24—24 which consist of a spring finger 84 (Figs. 13 and 14) adapted to be pressed into a spring socket 86. The finger 84 is fastened to the inside of one of the channels 26a and the socket 86 to the other, and openings are made through the opposite walls through which the parts may be engaged.

As illustrated by Figs. 4, 5 and 6, the shutter frames may be disposed in various positions so as most advantageously to exclude direct rays from the sun and at the same time to permit free circulation of air. In Fig. 4, the parts are disposed in drop front fashion, the upper sections 24 being inclined and the lower sections 23 being substantially vertical. If the rays from the sun enter at an angle from one side, the lower sections 26 may be folded inwardly to a substantially horizontal position, as illustrated in Fig. 5, in which case the braces 70 are folded into the channels and the ends of the sections are placed against the front window frame so as to rest on the prongs 85. The lower sections intercept any light or sun rays entering from the side, thereby taking the place of side members for the awning which are usually in the form of side flaps. It may be desirable to close most of the window, for example, when there is a driving rain and yet provide for some ventilation. This may be done by disposing the upper section in a substantially vertical position over the upper window and arranging the lower section at a flat angle, as shown in Fig. 6.

It is evident from the foregoing that the shutter sections may be arranged in a great number of positions so as to take care of most any situation which may be encountered and will provide for a maximum of shelter and protection against the sun and wind and at the same time afford adequate ventilation.

It should be understood that the present disclosure is for the purpose of illustration only and that this invention includes all modifications and equivalents which fall within the scope of the appended claims.

I claim:

1. A combination shutter and awning comprising a pair of shutter frames, each frame being transversely articulated to provide upper and lower sections movable relative to each other, means supporting the frames for movement from positions at opposite sides of the window to positions covering the window and means supporting the frames for swinging movement from positions parallel to the plane of the window to positions extending angularly out from the window, said lower sections being movable in unison with the upper sections to window covering position and thereafter relative to the upper sections, to dispose the lower sections at an angle to the upper sections and means for fixing the angular disposition of the upper and lower sections.

2. A combination shutter and awning comprising a pair of shutter frames, each frame being transversely articulated to provide upper and lower sections movable relative to each other, means attached to the window frame at the upper and lower ends of the shutters for supporting the upper and lower ends of the frames for movement from positions at opposite sides of the window to covering positions parallel to the window, auxiliary supporting means associated with the supporting means at the top of the shutter frames for supporting said upper sections for angular movement outwardly from the plane of the window, said lower sections being disengageable from their support and movable with the upper sections outwardly from the window and relative thereto to take up angular positions with respect to the upper sections, and means for fixing the angular disposition of the upper and lower sections.

3. A combination shutter and awning comprising a pair of shutter frames, each frame being articulated to provide upper and lower sections movable relative to each other about transverse axis, means supporting the frames for movement from positions at opposite sides of the window to positions covering the window, means supporting the frames for swinging movement from position parallel to the plane of the window to positions extending angularly out from the window, said lower sections being movable in unison with the upper sections to window covering positions and relative to the upper section about said transverse axes throughout substantially 180° of angular movement in either direction from a position in which the sections are in a common plane.

4. A combination shutter and awning comprising a pair of shutter frames, each frame being transversely articulated to provide upper and lower sections movable relative to each other, means fast to the window frame for supporting the upper section on the window frame for sliding movement from positions in which they cover the window to lateral positions uncovering the window, means carried by the first-named supporting means for supporting the frames for swinging movement about their upper ends from a plane parallel to the plane of the window to a position angularly thereto, said lower sections being movable in unison with the upper sections and relative thereto to dispose the lower sections at angles to the upper sections and means for fixing the angular disposition of the upper and lower sections.

5. A combination shutter and awning comprising a pair of shutter frames, each frame being transversely articulated to provide upper and lower sections movable relative to each other, a support at the top of the window frame including a track along which the upper sections are adapted to slide to and from each other from positions laterally of the window to positions covering the window in which their opposite edges abut, and hinge means associated with the support on which said upper sections are angularly movable about their upper ends outwardly from the plane of the window, the lower sections being movable relative to the upper sections about axes parallel to said hinge means and means for fixing the lower sections in the plane of the upper sections or at any angular position with reference thereto.

6. A combination shutter and awning comprising a pair of shutter frames, each frame being transversely articulated to provide upper and lower sections movable relative to each other, a track arranged transversely of the window frame across the top thereof, said track being hinged for angular movement outwardly from the frame about an axis extending lengthwise thereof, means slidably connecting the upper ends of the upper sections to said track from movement to and from each other from lateral positions at opposite sides of the window to positions covering the window with their opposed edges abutting, said lower sections being movable in unison with the upper section and angular with reference thereto, and means for fixing the angular positions of said section.

7. A combination shutter and awning comprising a pair of shutter frames, each frame being transversely articulated to provide upper and lower sections movable relative to each other, a track arranged transversely of the window frame across the top thereof, said track being hinged for movement angularly outward from the window frame about an axis extending lengthwise thereof, roller bearings distributed lengthwise to the track transversely thereof, flanges at the upper ends of the upper sections and means on the track for holding the flanged ends of the upper sections in a sliding contact with the roller bearings, said sections being movable along the track from lateral positions at opposite sides of the window to positions covering the window wherein the opposed edges are abutting and movable angularly out from the plane of the window on said hinge, said lower sections being movable both laterally and angularly with the upper sections and movable angularly relative to the upper section, and means for fixing the angular positions of the lower sections with reference to the upper sections.

8. A combination shutter and awning comprising a pair of shutter frames, each frame being transversely articulated to provide upper and lower sections movable relative to each other, a track arranged transversely of the window frame across the top thereof, said track being hinged for movement angularly outward from the window frame, about an axis extending lengthwise thereof, said track being channel-shaped and having inwardly direct flanges along its open sides between which the upper ends of the upper sections are slidably disposed, roller bearings at the upper ends of the sections having rolling contact with the inside of said flanges, and supporting the sections for transverse movement to and from each other from positions laterally of the window to positions covering the window, and means for fixing the angular positions of the lower sections with reference to the upper sections.

9. A combination shutter and awning comprising a pair of shutter frames, each frame being transversely articulated to provide upper and lower sections movable relative to each other, supports at the top and bottom of the window frame including tracks along which the upper and lower sections are adapted to slide when disposed in a common plane to and from each other from lateral positions at opposite sides of the window to positions covering the window in which their edges abut, means hingeably fastening the frames to the upper support for permitting angular movement of the frames outwardly from the plane of the window, said lower sections being disengageable from the lower support when the frames are moved outwardly from the window, and means for supporting the lower sections at an angle relative to the upper sections, independently of the lower support when disengaged therefrom.

10. A combination shutter and awning comprising a pair of shutter frames, each frame being transversely articulated to provide upper and lower sections movable relative to each other tracks fast to the top and bottom of the window frame for slidably receiving the upper and lower ends of the frames when in a common plane, said upper track being hinged for angular movement outwardly from the window frame about an axis longitudinally thereof, said frames being movable laterally along the track in opposite directions to cover or uncover the window, the lower ends of the frames being disengageable from the lower track to permit angular swinging movement of the frames outwardly from the window on the upper track hinge, and means for fixing the lower sections at an angle to the upper sections when disengaged from the lower track.

11. A combination shutter and awning according to claim 7 wherein, there are anti-friction bearings in the tracks against which the ends of the frames are deposed for movement along the tracks.

12. A combination shutter and awning comprising a pair of shutter frames, each frame being transversely articulated to provide upper and lower sections movable relative to each other, means supporting the upper section for sliding movement from positions in which they cover the window to positions uncovering the window means supporting the upper sections for swinging movement about their upper ends from a plane parallel to the plane of the window to a position angularly thereto, said lower sections being movable with the upper sections and relative thereto, to dispose the lower sections at angles to the upper sections so as to extend substantially horizontally inward with their lower ends abutting the window frame and means on the window frame for receiving and supporting the abutting ends of the lower sections against downward displacement.

13. A combination shutter and awning comprising a pair of shutter frames, each frame being transversely articulated to provide upper and lower sections movable relative to each other, means supporting the upper sections for sliding movement from positions in which they cover the window to positions uncovering the window means supporting the upper sections for swinging movement about their upper ends from a plane parallel to the plane of the window, to a position angularly thereto, said lower sections being movable with the upper sections and relative thereto, means for fixing the lower sections at angles to the upper sections and brace means pivotally connected at one end to the lower ends of the lower sections, the other ends of said brace means being adapted to rest against the window frame, and means on the window frame for supporting the free ends of the brace means against displacement.

14. A combination shutter and awning comprising a pair of shutter frames, each frame being transversely articulated to provide upper and lower sections movable relative to each other, means supporting the upper sections for sliding movement from positions in which they cover the window to positions uncovering the window other means for supporting the upper section for swinging movement about their upper ends from a plane parallel to the plane of the window to a position angularly thereto, said lower sections being movable with the upper sections and relative thereto, means for fixing the lower sections at angles to the upper sections, adjustable braces pivotally connected at one end to the lower ends of the lower sections, and vertically spaced means on the window casing for lockingly receiving the free ends of said brace means in any one of several predetermined vertical positions.

15. A combination shutter and awning comprising a pair of shutter frames, each frame being transversely articulated to provide upper and lower sections movable relative to each other, means suporting the upper sections for sliding movement from positions in which they cover the windows to positions uncovering the windows means carried by the first-named means for supporting the upper section for swinging movement from a plane parallel to the plane of the window to a position angularly thereto, said lower sections being movable with the upper sections and relative thereto, means for fixing the lower sections at angles to the upper sections, said lower section having hollow side bars, brace members pivotally connected to the lower ends of the lower sections and foldable into said hollow side bars so as to be stored therein when not in use and being unfoldable to bring their ends into engagement with the window frame, and means for releasably locking the free ends of the braces to the window frame at any one of several predetermined vertical positions.

EVERETT T. WHEELER.

REFERENCES CITED

The following references are of record in the file of this patent:

UNITED STATES PATENTS

| Number | Name | Date |
| --- | --- | --- |
| 210,591 | Ambler | Dec. 10, 1878 |
| 232,883 | Carey, Jr. | Oct. 5, 1880 |
| 330,203 | Bickner | Nov. 10, 1885 |
| 382,707 | Keating | May 15, 1888 |
| 1,961,327 | Barth | June 5, 1934 |